(12) United States Patent
Ishikawa et al.

(10) Patent No.: US 9,077,234 B2
(45) Date of Patent: Jul. 7, 2015

(54) VEHICLE AC GENERATOR

(75) Inventors: Toshio Ishikawa, Hitachinaka (JP);
Yosuke Umesaki, Hitachinaka (JP);
Mitsuaki Izumi, Hitachinaka (JP);
Naoyuki Taguchi, Hitachinaka (JP);
Tsuyoshi Harada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 209 days.

(21) Appl. No.: 13/579,451

(22) PCT Filed: Aug. 13, 2010

(86) PCT No.: PCT/JP2010/063743
§ 371 (c)(1),
(2), (4) Date: Aug. 16, 2012

(87) PCT Pub. No.: WO2011/111246
PCT Pub. Date: Sep. 15, 2011

(65) Prior Publication Data
US 2012/0306300 A1    Dec. 6, 2012

(30) Foreign Application Priority Data
Mar. 12, 2010    (JP) .................................. 2010-056089

(51) Int. Cl.
*H02K 11/04*    (2006.01)
*H02K 9/06*    (2006.01)

(52) U.S. Cl.
CPC ................ *H02K 11/048* (2013.01); *H02K 9/06* (2013.01)

(58) Field of Classification Search
USPC ................................................ 310/64, 68 D
IPC ........................................ H02K 11/046,19/365
See application file for complete search history.

(56) References Cited

U.S. PATENT DOCUMENTS 5,949,166 A    9/1999    Ooiwa et al.
6,184,602 B1 *    2/2001    Ooiwa et al. ................ 310/68 D
(Continued)

FOREIGN PATENT DOCUMENTS

JP    4-244770    9/1992
JP    11-164538    6/1999
(Continued)

OTHER PUBLICATIONS

PCT International Search Report on application PCT/JP2010/063743 mailed Nov. 16, 20120; 2 pages.

*Primary Examiner* — Dang Le
(74) *Attorney, Agent, or Firm* — Foley & Lardner LLP

(57) ABSTRACT

A vehicle AC generator includes a stator having stator windings; front frame and rear frame, each rotatably supporting a rotor; a cooling fan fitted to the rotor; first polarity arm and second polarity arm configured to rectify currents of one polarity and another polarity, respectively; a rectifier device configured to rectify an alternating current generated in the stator windings; and a protective cover covering the rectifier device. The rectifier device includes a first heat dissipating plate having rectifier elements forming the first polarity arm, a second heat dissipating plate rectifier elements forming the second polarity arm, and a connection plate formed in waveform-like shape and disposed between the first and second heat dissipating plates, and a passage of a cooling air blown by the cooling fan formed between the first and second heat dissipating plates and between the second heat dissipating plate and the connection plate.

7 Claims, 11 Drawing Sheets

(56) References Cited

U.S. PATENT DOCUMENTS

| | | | |
|---|---|---|---|
| 7,781,923 B2 * | 8/2010 | Koumura et al. | 310/43 |
| 2003/0137201 A1 | 7/2003 | Nakano | |
| 2004/0041476 A1 | 3/2004 | Ihata et al. | |
| 2004/0239195 A1 | 12/2004 | Okamura et al. | |
| 2009/0134749 A1 | 5/2009 | Nakamura et al. | |

FOREIGN PATENT DOCUMENTS

| | | |
|---|---|---|
| JP | 2003-219604 A | 7/2003 |
| JP | 2004-147486 A | 5/2004 |
| JP | 2004-357451 A | 12/2004 |
| JP | 2009-060711 A | 3/2009 |
| JP | 2009-131018 A | 6/2009 |

* cited by examiner

VEHICLE AC GENERATOR

TECHNICAL FIELD

The present invention relates to a vehicle AC generator.

BACKGROUND ART

In recent years, there is a tendency that output of the vehicle AC generator is becoming higher due to increased demands of electronic devices in a vehicle. A high output of the vehicle AC generator increases an output current and thereby increases the amount of heat of components thereof, which results in reducing a quality service life due to a temperature rise.

In particular, a rectifier element rectifying an alternating current generated by the vehicle AC generator is significantly affected by the temperature due to heating, and when the temperature becomes higher than a heat resistance temperature, the service life thereof is reduced sharply.

Further, in recent years, ambient temperature around a vehicle AC generator mounted in a vehicle tends to increase due to the space saving of the engine room. Consequently, increase in the amount of heat and the temperature reduction by improving the cooling performance of the rectifier element has become important problems.

Under such circumstances, Patent Literature 1 proposes a method for improving the cooling efficiency of the rectifier device, which efficiently takes in and flows an external cooling air into a space between positive rectifier elements (positive arm) and a protective cover and into a space between a rear frame and a second heat dissipating plate of negative rectifier elements (negative arm) to increase the cooling efficiency of heat dissipating plates and thereby reduce temperature of rectifier elements.

CITATION LIST

Patent Literature

Patent Literature 1: Japanese Unexamined Patent Application Publication No. 11-164538

SUMMARY OF INVENTION

Technical Problem

In recent years, however, there is a tendency that power demands from the vehicle side are increasing steadily. Due to a significant increase of electric power generated by the vehicle AC generator, the rectifier device cooling method according to Patent Literature 1 has problems in that a heat dissipating area of heat dissipating plates can not be secured due to a limited space, the cooling capacity of heat dissipating plates has reached a saturated state, and temperature of rectifier elements subjected to a high output becomes higher than a heat resistance temperature, which results in sharp reduction of the service life thereof.

It is an object of the present invention to provide a vehicle AC generator capable of achieving a high quality and a high output by improving the cooling efficiency of heat dissipating plates of a rectifier device.

Solution to Problem

In order to solve the foregoing problems, the present invention adopts the means described below.

A vehicle AC generator according to an aspect of the present invention comprises a stator comprising stator windings, a front frame and a rear frame, each of which rotatably supports a rotor in the stator facing thereto via a space on the inner circumference of the stator, a cooling fan fitted to the rotor, a first polarity arm configured to rectify a current of one polarity, a second polarity arm configured to rectify a current of another polarity, a rectifier device configured to rectify an alternating current generated in the stator windings, and a protective cover which covers the rectifier device, wherein the rectifier device comprises a first heat dissipating plate having a plurality of rectifier elements forming the first polarity arm, a second heat dissipating plate having a plurality of rectifier elements forming the second polarity arm, and a connection plate in a waveform-like shape disposed between the first heat dissipating plate and the second heat dissipating plate, and passages of cooling air taken in by the cooling fan are provided between the first heat dissipating plate and the connection plate, and between the second heat dissipating plate and the connection plate.

Advantageous Effects of Invention

According to an aspect of the present invention, a passage of the cooling air formed between the first and second heat dissipating plates forming the rectifier device of the AC generator can be distributed in a balanced manner to the first heat dissipating plate side and the second heat dissipating plate. With this configuration, a vehicle AC generator with a rectifier device capable of improving the cooling performance of rectifier elements can be provided.

Other objects, features and advantages of the present invention will be more apparent on consideration of the following description of embodiments thereof with reference to the accompanying drawings.

DESCRIPTION OF EMBODIMENTS

Hereinafter, embodiments are described with reference to the accompanying drawings.

[First Embodiment]

The configuration of a vehicle AC generator according to a first embodiment of the present invention is described with reference to FIG. 1 and FIG. 2.

Figure 1:
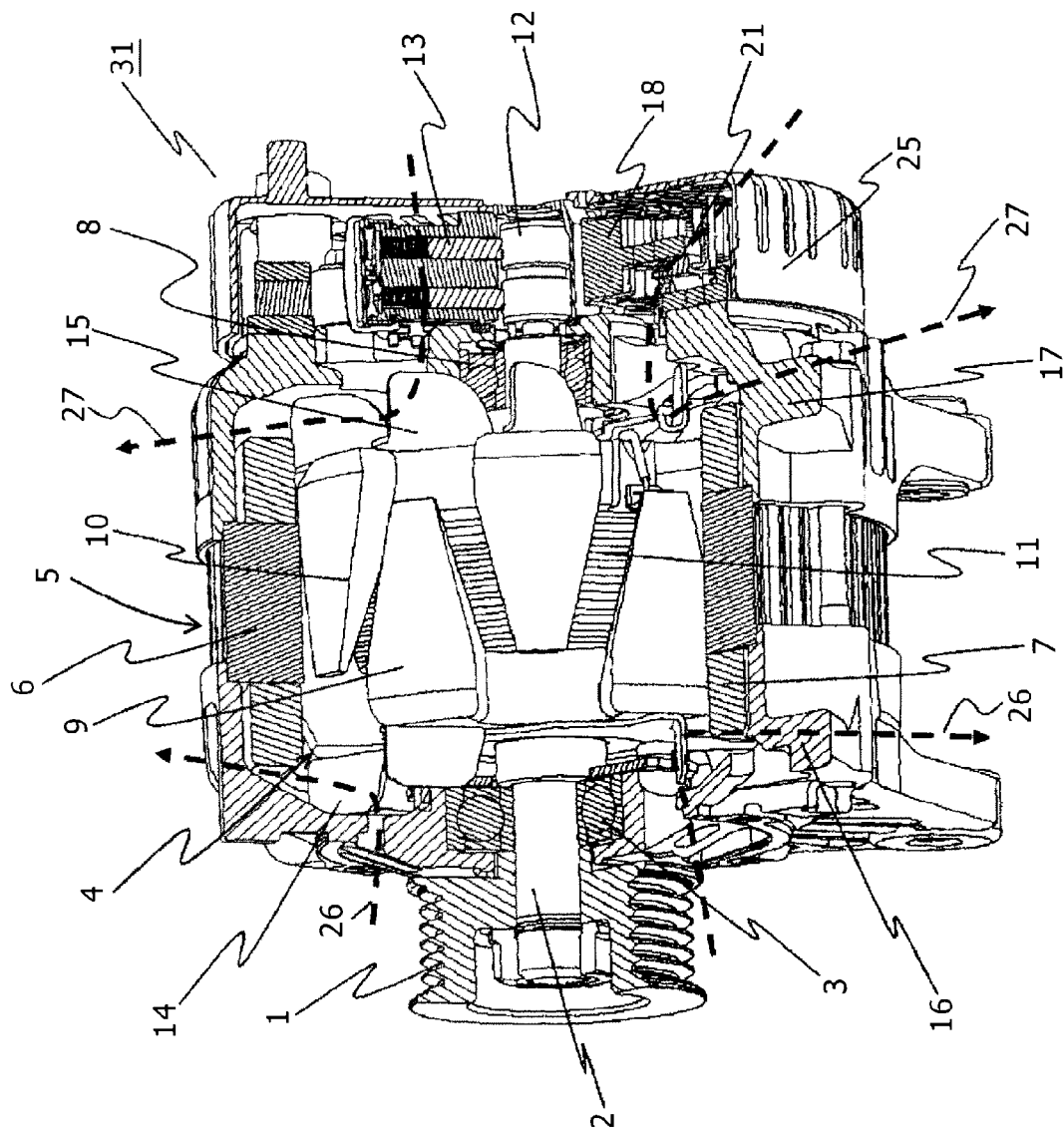
FIG. 1 is a cross sectional view showing an overall configuration of a vehicle AC generator according to a first embodiment of the present invention.
Figure 2:
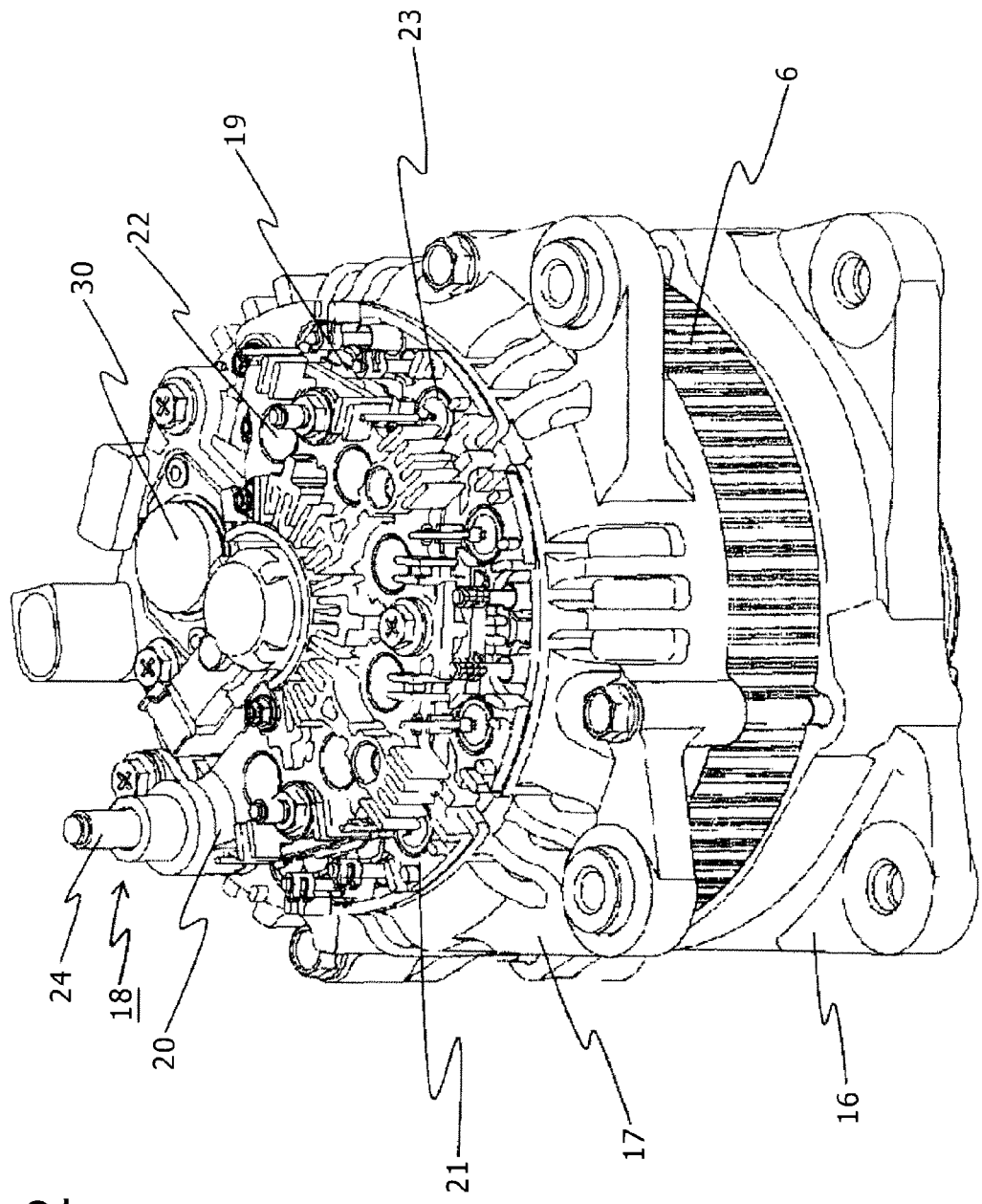
FIG. 2 is a rear-side perspective view of the vehicle AC generator with a protective cover removed, according to the first embodiment of the present invention.

FIG. 1 is a cross sectional view showing an overall configuration of the vehicle AC generator according to the first embodiment of the present invention, and FIG. 2 is a rear-side perspective view of the vehicle AC generator with a protective cover removed.

The vehicle AC generator 31 comprises a rotor 4 and a stator 5. The rotor 4 comprises a shaft 2 at the center thereof, a front-side nail-shaped magnetic pole 9 and a rear-side nail-shaped magnetic pole 10. Each of the nail-shaped magnetic poles are formed with a magnetic material and disposed on each side of the shaft 2 so as to cover field windings 11 by sandwiching from both sides. Further, the front nail-shaped magnetic pole 9 and the rear nail-shaped magnetic pole 10 are disposed in such a manner that nail-shaped portions thereof face to each other, and one nail-shaped magnetic pole engages with another corresponding nail-shaped magnetic pole.

The rotor 4 is disposed on the inner peripheral side of the stator 5 by facing each other via a small space. The shaft 2 of the rotor 4 is inserted through an inner ring of a front bearing 3 and a rear bearing 8 and supported therein in a rotatable manner.

The stator 5 comprises a stator iron core 6 and stator windings 7. The stator iron core 6 comprises a plurality of laminated thin steel sheets formed in an annular shape, and projected teeth on the inner peripheral side thereof, with a slot formed between respective teeth. Stator windings 7 of respective phases are fitted by inserting into corresponding slots across multiple teeth, and both ends of the stator 5 are held by a front frame 16 and a rear frame 17.

A pulley 1 is fitted to one end portion of the shaft 2. A slip ring 12 is provided at the other end portion of the shaft 2 and is in contact with a brush 13 to supply electric power to field windings 11. Further, a front fan 14 and a rear fan 15 are provided on both end faces of the front nail-shaped magnetic pole 9 and the rear nail-shaped magnetic pole 10 in the rotor 4. The front fan 14 and the rear fan 15 are cooling fans having a plurality of vanes on the outer peripheral side thereof, and are configured to distribute air by a centrifugal force caused by rotation thereof to intake external air and discharge air used to cool down internal components, to the outside.

A front-side cooling air 26 enters through an air window of the front frame 16, passes through the front fan 14 and is discharged through the air window of the front frame 16 while being blown to coil ends of the stator windings 7. A rear-side cooling air 27 enters through openings of a protective cover 25, passes through a rectifier device 18 and an IC regulator 30, passes through a rear fan 15 through an air window provided at a center portion of the rear frame, and is discharged through the air window of the rear frame 17 while being blown to coil ends of the stator windings 7.

According to the present embodiment, the stator windings 7 comprise two pairs of three-phase windings, and a lead wire of each winding is connected to the rectifier device 18. The rectifier device 18 comprises rectifier elements such as diodes and forms a full-wave rectifying circuit. For example, in the case of the diode, a cathode terminal is connected to a rectifier element connection plate 19. An anode terminal is electrically connected to a main body of the vehicle AC generator. The protective cover 25 serves to protect the rectifier device 18.

Next, power generating operation is described.

First, as the engine starts, rotation is transmitted from a crank shaft to a pulley 1 via a belt, and the rotor 4 is rotated via the shaft 2. Here, when DC current is supplied from a brush 13 to field windings 11 provided on the rotor 4 via a slip ring 12, a magnetic flux circling around inner and outer circumference of the field windings 11 occurs and thereby N-pole and S-pole are formed alternately in the circumferential direction on the front nail-shaped magnetic pole 9 and the rear nail-shaped magnetic pole 10 in the rotor 4. The magnetic flux generated by the field windings 11 passes the stator iron core 6 through an N-pole of the front nail-shaped magnetic pole 9, circles around the stator windings 7, and reaches an S-pole of the rear nail-shaped magnetic pole 10 in the rotor, whereby a magnetic circuit circling the rotor 4 and the stator 5 is formed. The magnetic flux thus generated on the rotor interlinks with the stator windings 7 and generates an alternating voltage on each of U-phase, V-phase and W-phase stator windings 7, or a three-phase alternating voltage as a whole.

The alternating voltage thus generated is subjected to a full-wave rectification by the rectifier device 18 comprising rectifier elements such as diodes, and is converted to a DC voltage. The rectified DC voltage is regulated to a constant voltage by the IC regulator 30 which controls a current supplied to the field windings 11.

Next, the configuration of the rectifier device of the vehicle AC generator according to the present embodiment is described with reference to FIG. 2 to FIG. 8.

Figure 3:
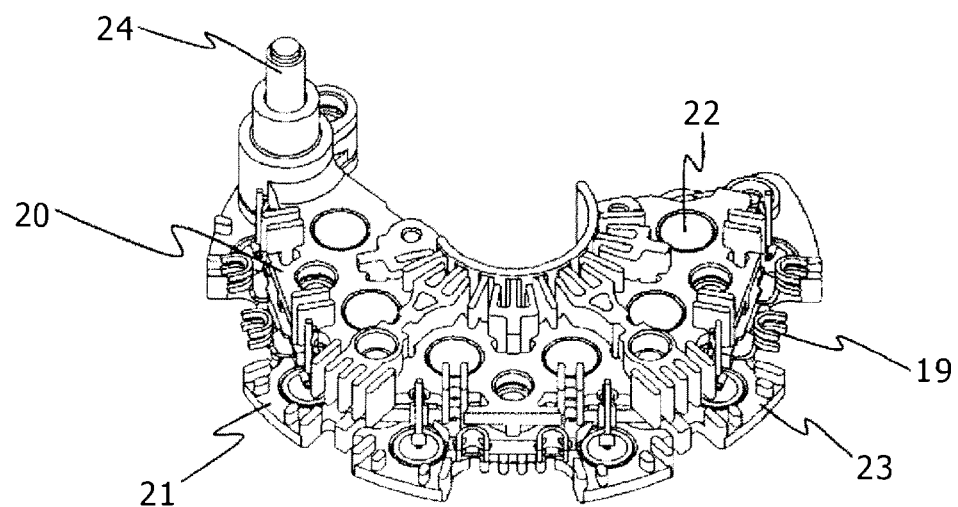
FIG. 3 is a perspective view of a rectifier according to the first embodiment of the present invention.
Figure 4:
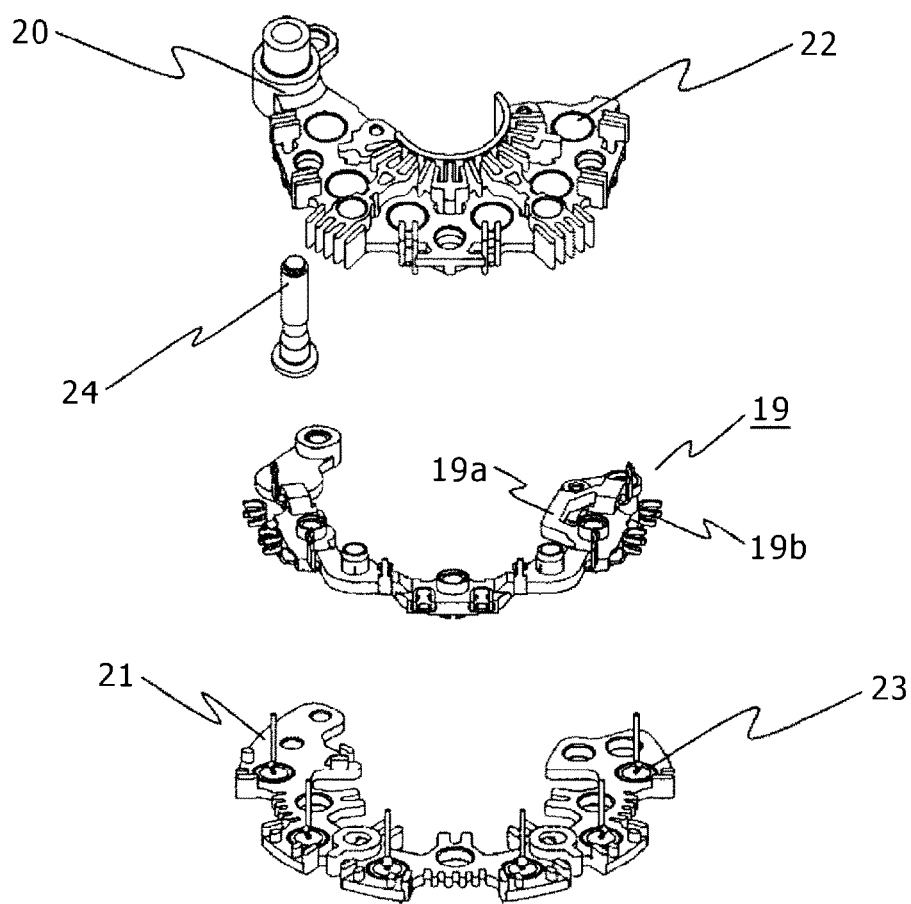
FIG. 4 is an exploded view of the rectifier according to the first embodiment of the present invention.
Figure 5:
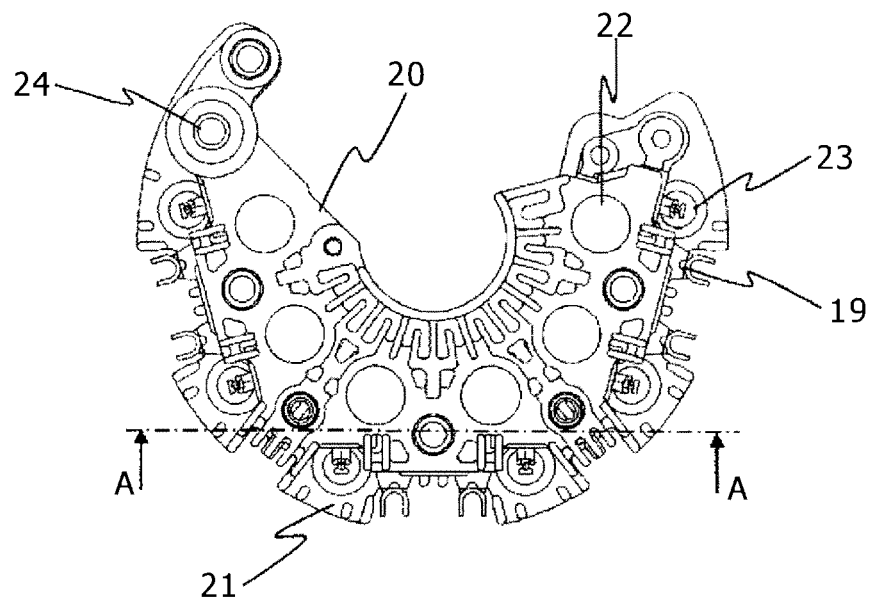
FIG. 5 is a rear-side front view of the rectifier according to the first embodiment of the present invention.
Figure 6:
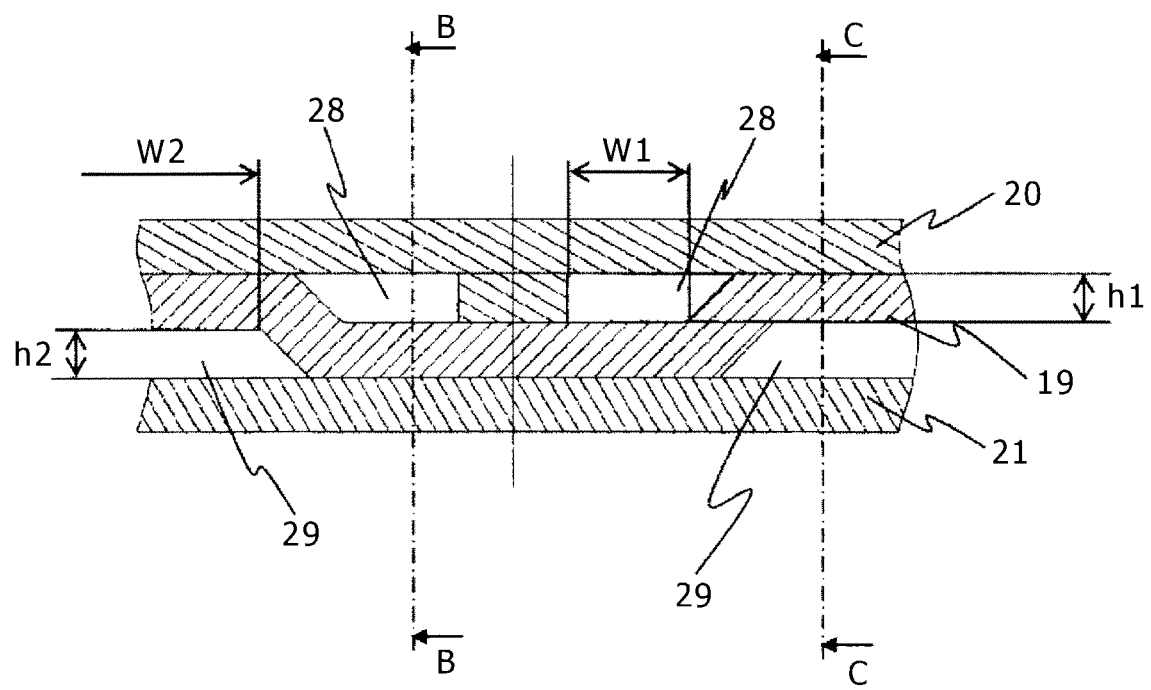
FIG. 6 is a cross sectional view taken from line A-A of FIG. 5.
Figure 7:
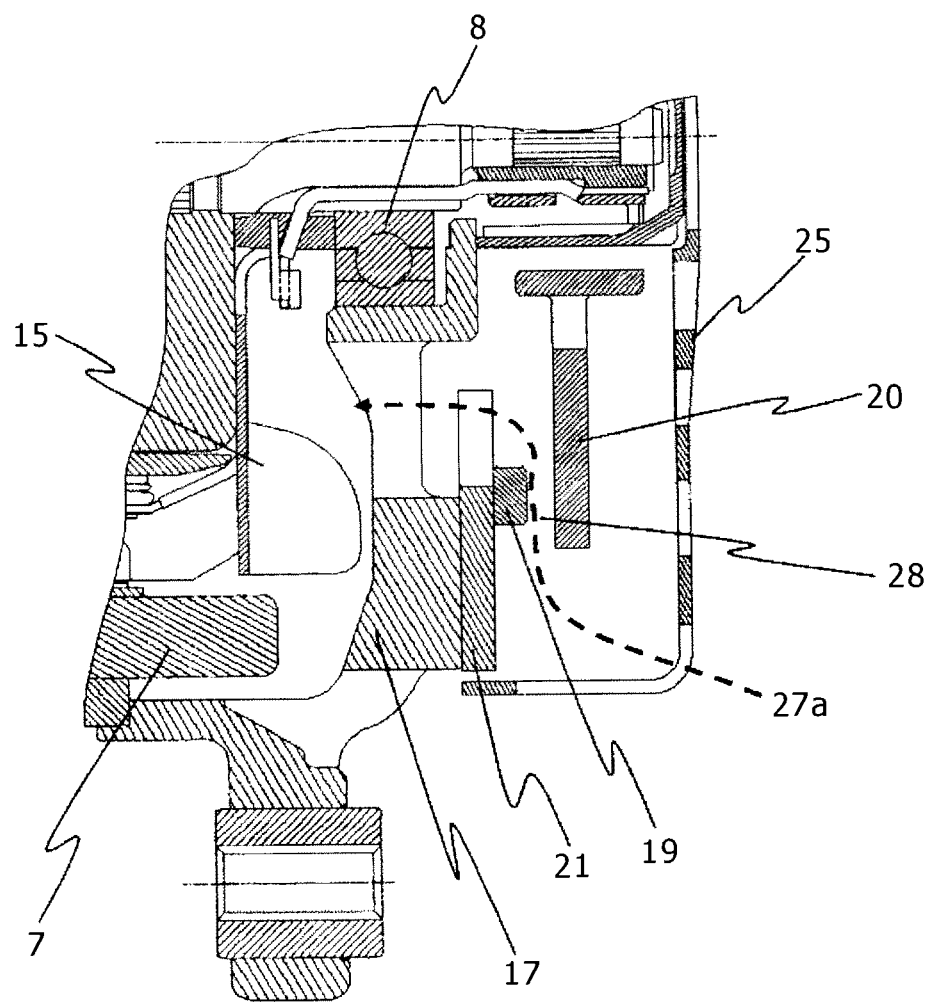
FIG. 7 is a cross sectional view taken from line B-B of FIG. 6.
Figure 8:
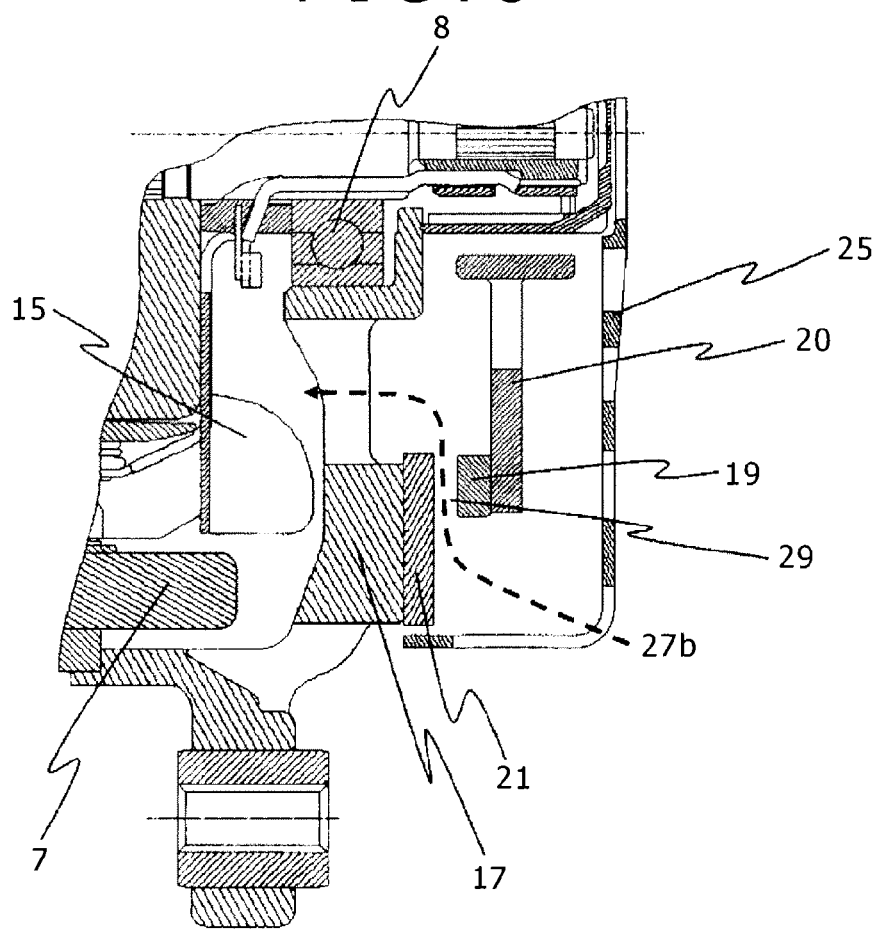
FIG. 8 is a cross sectional view taken from line C-C of FIG. 6.

FIG. 3 is a perspective view of the rectifier device according to the first embodiment of the present invention. FIG. 4 is an exploded view of the rectifier device according to the first embodiment of the present invention. FIG. 5 is a rear-side front view of the rectifier according to the first embodiment of the present invention. FIG. 6 is a cross sectional view taken from line A-A of FIG. 5. FIG. 7 is a cross sectional view taken from line B-B of FIG. 6. FIG. 8 is a cross sectional view taken from line C-C of FIG. 6.

As shown in FIG. 3 and FIG. 4, the rectifier device 18 of the vehicle AC generator 31 comprises a first heat dissipating plate 20 and a second heat dissipating plate 21, which are disposed opposite to each other. The first heat dissipating plate 20 comprises six positive rectifier elements 22 (positive arm), and the second heat dissipating plate 21 comprises six negative rectifier elements 23 (negative arm).

A rectifier element connection plate (connection terminal plate) 19 forming a full-wave rectifying circuit by connecting rectifier elements is provided between the first heat dissipating plate 20 and the second heat dissipating plate 21. The terminal plate also serves to keep a predetermined electrical insulation distance between the first heat dissipating plate 20 and the second heat dissipating plate 21.

The rectifier element connection plate 19 comprises an insulating material portion 19a of resin mold and a terminal 19b made of iron or copper by insert molding, and forms a rectifier circuit by connecting the respective rectifier elements. The vehicle AC generator 31 functions when the stator windings 7 and the IC regulator 30 are connected to each other.

The rectifier device 18 is mounted in the rear frame 17 as shown in FIG. 2. The second heat dissipating plate 21 of the rectifier device 18 is in direct contact with the rear frame 17 and configured to transmit the amount of heat generated by negative rectifier elements 23 to the second heat dissipating plate 21 and release heat directly to the rear frame 17 to secure a heat dissipating area and thereby improve the cooling performance.

On the side of the first heat dissipating plate 20, a plurality of cooling fans are provided on an inner circumference of the protective cover to expand the heat dissipating area by efficiently utilizing a space within the protective cover 25, and a cooling air flowing from the outside is blown thereto to cool down positive rectifier elements.

In particular, speed of the cooling air passing in the rotating axis direction becomes fast in cooling fins on the inner circumference, so that cooling effects can be drastically improved by providing a lot of cooling fins thereat.

As described above, however, increase of power demands from the vehicle side in recent years significantly increases an output current of the vehicle AC generator which generates high output.

To solve the problem, an aspect of the present invention improves the cooling performance of the rectifier device 20 by efficiently utilizing a cooling air passing between the first heat dissipating plate 20 and the second heat dissipating plate 21.

A specific embodiment is described with reference to FIG. 5 to FIG. 8.

The cooling air flows at a relatively high speed between the first heat dissipating plate 20 and the second heat dissipating plate 21, so that heat transfer efficiency of nearby heat dissipating plates is high and effective in cooling the rectifier elements.

According to a conventional configuration, the rectifier element connection plate 19 between the first heat dissipating plate 20 and the second heat dissipating plate 21 is configured to be in contact with the second heat dissipating plate 21. This configuration lowers heat transfer efficiency of the rectifier element connection plate 19 disposed between the first heat dissipating plate 20 and the second heat dissipating plate 21, and consequently lowers cooling performance. The first heat dissipating plate 20 is provided partially with multiple spaces formed in a recessed shape through which a cooling air passes, which improve heat transfer efficiency of the first heat dissipating plate 20 and thereby contribute to temperature reduction of positive rectifier elements 22.

According to an aspect of the present invention, cooling performance of the second heat dissipating plate 21 is improved without impairing cooling performance of the first heat dissipating plate 20.

FIG. 5 is a rear-side front view of the rectifier device according to the present embodiment, and FIG. 6 is a cross sectional view taken from line A-A of FIG. 5.

As shown in FIG. 6, according to an aspect of the present invention, one side of the rectifier element connection plate 19 is in contact with the first heat dissipating plate 20, and the other side thereof faces a space 29 formed apart from the second rectifier element connection plate 21. Further, one side thereof faces a space 28 formed apart from the first heat dissipating plate 20, and the other side is in contact with the second heat dissipating plate 21. That is, the rectifier element connection plate 19 is formed in a waveform-like shape.

For this reason, as shown in FIG. 7 which is a cross sectional view taken from line B-B of FIG. 6, a cooling air 27a passes through the space 28 between the first heat dissipating plate 20 and the rectifier element connection plate 19 in a same manner as the conventional configuration. Consequently, heat transfer efficiency of the first heat dissipating plate 20 is not impaired, and temperature of positive rectifier elements remains same as the conventional configuration.

Further, as shown in FIG. 8 which is a cross sectional view taken from line C-C of FIG. 6, a cooling air 27b passes through the space 29 between the second heat dissipating plate 21 and the rectifier element connection plate 19, so that cooling performance of the second heat dissipating plate 21 is improved and thereby temperature of negative rectifier elements 23 is reduced.

In such a manner, by forming the rectifier element connection plate 19 (terminal plate) in a waveform-like shape, a cooling air passing through between the first heat dissipating plate 20 and the second heat dissipating plate 21 can be distributed in a balanced manner to sides of the first heat dissipating plate 20 and the second heat dissipating plate 21, so that temperature of negative rectifier elements 23 can be reduced without pairing cooling performance of positive rectifier elements 22.

Further, to make temperature of positive rectifier elements 22 and temperature of negative rectifier elements 23 equal to each other, a space width W1 and a space height h1 on the side of the first heat dissipating plate, and a space width W2 and a space height h2 on the side of the second heat dissipating plate may be adjusted as shown in FIG. 6. According to the present embodiment, the space height h1 on the side of the first heat dissipating plate and the space height h2 on the side of the second heat dissipating plate are equal to each other, while the space width W1 on the side of the first heat dissipating plate and the space width W2 on the side of the second heat dissipating plate are adjusted to keep a balance between temperature of positive rectifier elements and temperature of negative rectifier elements. In the case of the example shown in FIG. 6, the space width W2 on the side of the second heat dissipating plate is 1.1 to 1.3 times the space width W1 on the side of the first heat dissipating plate. It is preferable that space widths W1, W2 are 4.5 mm or wider, and space heights h1, h2 are 3.2 mm or higher.

[Second Embodiment]

Figure 9:
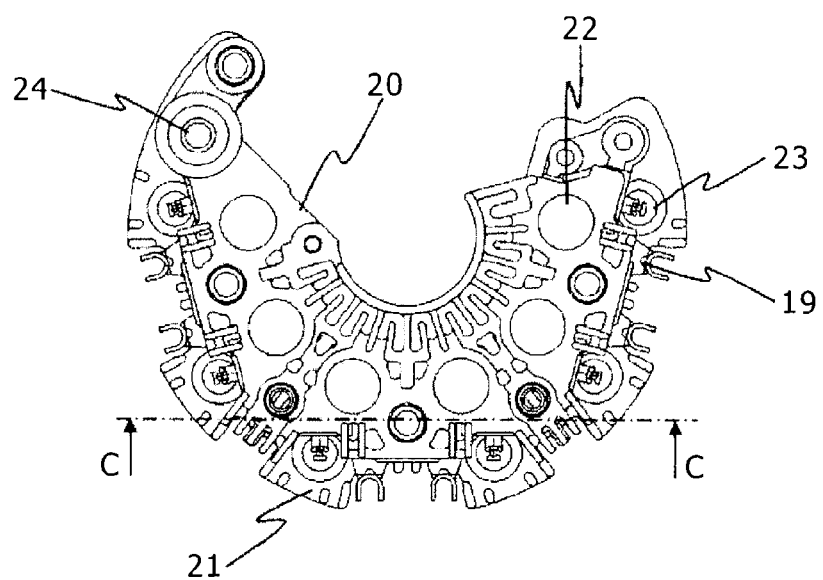
FIG. 9 is a rear-side front view of a rectifier according to a second embodiment of the present invention.
Figure 10:
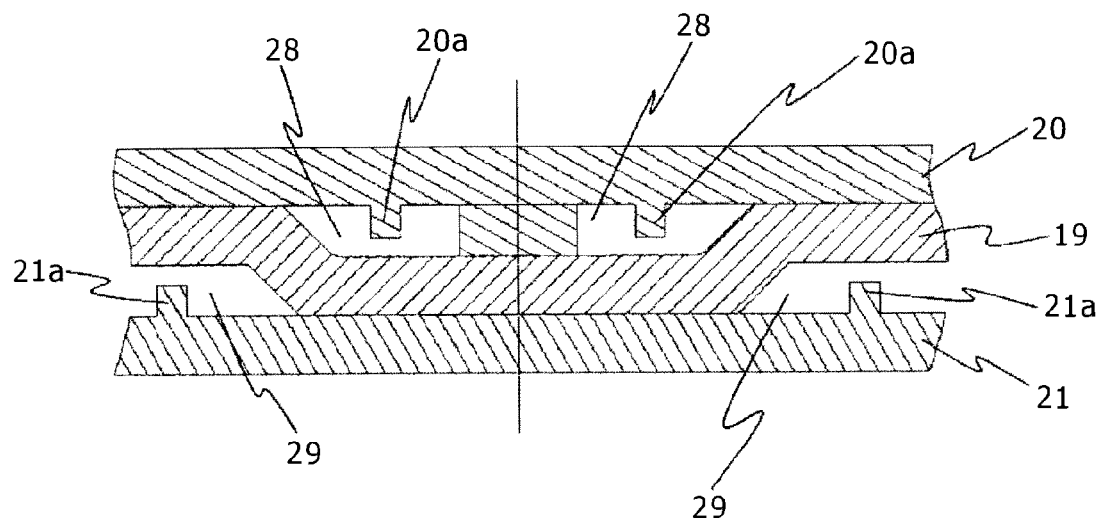
FIG. 10 is a cross sectional view taken from line E-E of FIG. 9.

Next, a second embodiment is described based on FIG. 9 and FIG. 10.

FIG. 9 is a rear-side front view of a rectifier according to the second embodiment.

FIG. 10 is a cross sectional view taken from line C-C of FIG. 9.

According to the present embodiment, a cooling fin 20a formed on the first heat dissipating plate 20 is disposed in a space 28 on the side of the first heat dissipating plate, whereby the heat dissipating area can be expanded. Further, by blowing a cooling air 27a thereto, heat transfer efficiency of the first heat dissipating plate can be improved and thereby temperature of positive rectifier elements 22 can be reduced.

In the same manner, the heat dissipating area also can be expanded by disposing, in a space 29 on the side of the second heat dissipating plate, a cooling fin 21a formed on the first heat dissipating plate 20. Further, by blowing a cooling air 28a thereto, heat transfer efficiency of the first heat dissipating plate can be improved and thereby temperature of positive rectifier elements 23 can be reduced. Thus, compared to the first embodiment, cooling performance of the rectifier device can be further improved by disposing cooling fins in spaces 28 on the side of the first heat dissipating plate and in spaces 29 on the side of the second heat dissipating plate.

[Third Embodiment]

Figure 11:
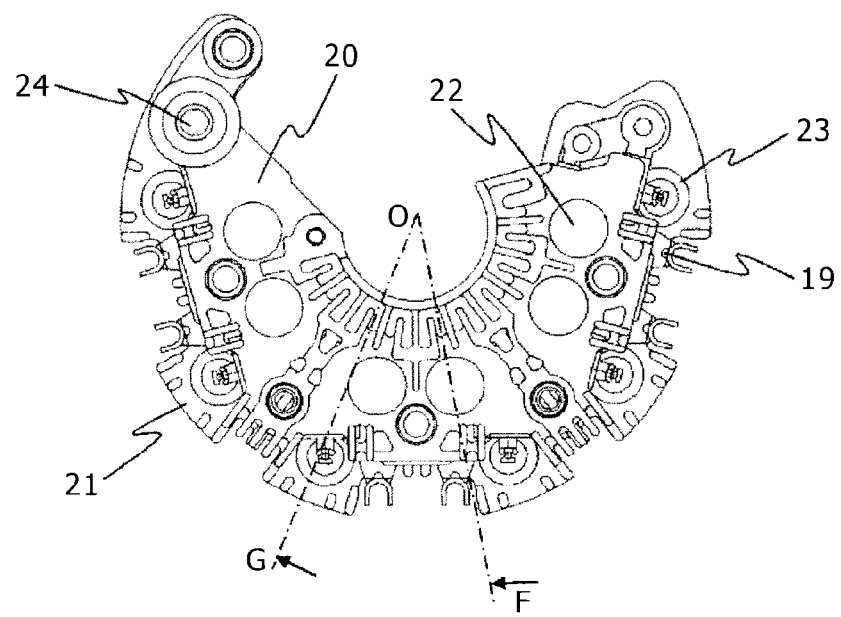
FIG. 11 is a rear-side front view of a rectifier according to a third embodiment of the present invention.
Figure 12:
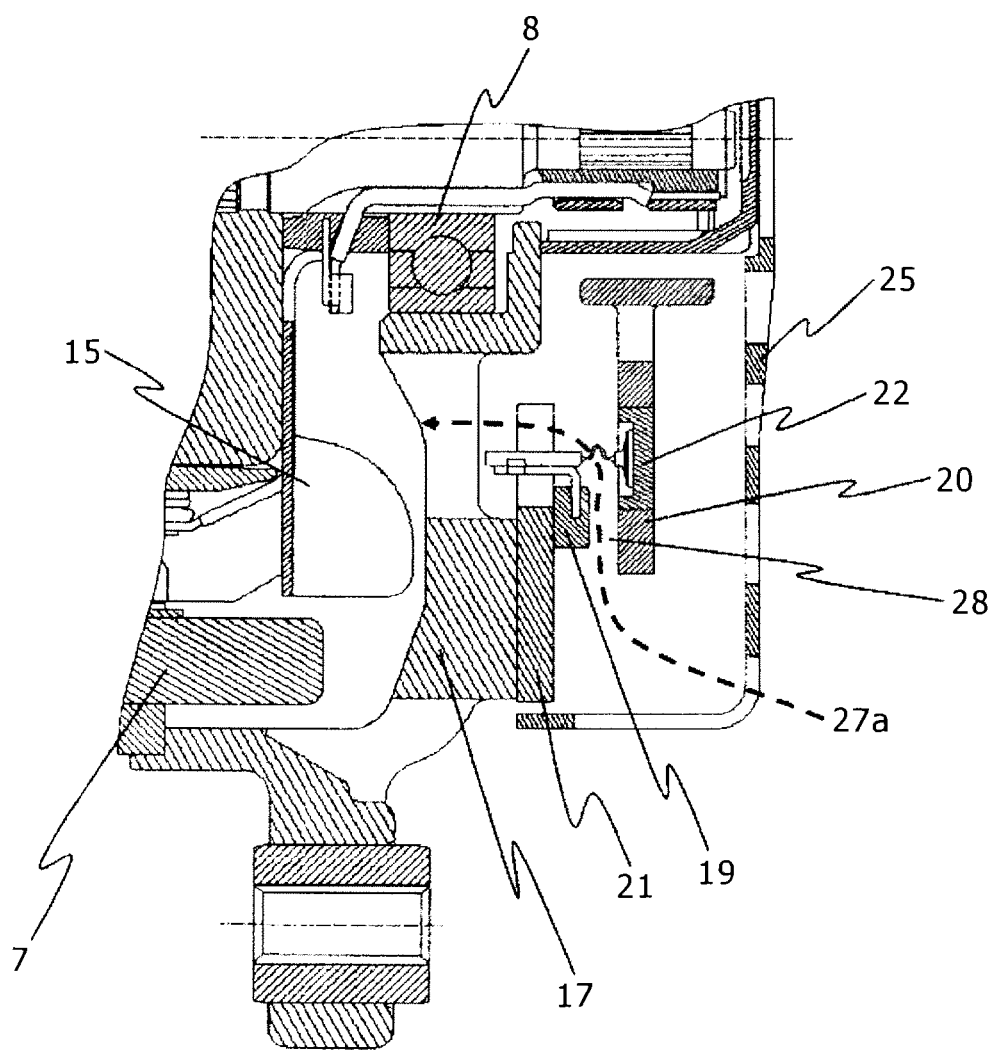
FIG. 12 is a cross sectional view taken from line O-F of FIG. 11.
Figure 13:
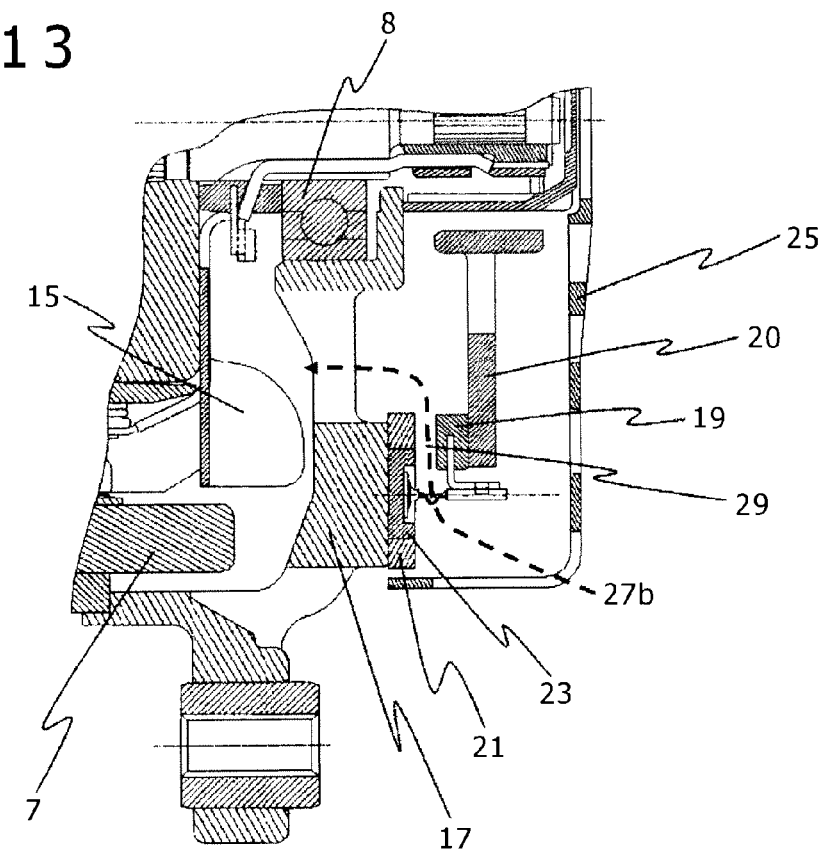
FIG. 13 is a cross sectional view taken from line O-G of FIG. 11.

Next, a third embodiment is described based on FIG. 11, FIG. 12 and FIG. 13.

FIG. 11 is a rear-side front view of a rectifier device according to the third embodiment. FIG. 12 is a cross sectional view taken from line O-F of FIG. 11. FIG. 13 is a cross sectional view taken from line O-G of FIG. 11.

As shown in FIG. 12, a positive rectifier element 22 is disposed in a space 28 on the side of the first heat dissipating plate, and a cooling air 27a is guided to pass through the space 28 on the side of the first heat dissipating plate to directly cool down the positive rectifier element 22, whereby temperature reduction effect can be improved.

Further, as shown in FIG. 13, a negative rectifier element 23 is disposed in a space 29 on the side of the second heat dissipating plate, and a cooling air 27b is guided to pass through the space 29 to directly cool down the negative rectifier element 23, whereby temperature reduction effect can be improved. Further, since the negative rectifier element 23 and the rear frame 17 are in direct contact with each other, heat is dissipated directly to the rear frame 17 having a large heat dissipating area, whereby temperature reduction effect of the negative rectifier element 23 is improved.

Compared to the first and second embodiments, the present embodiment disposes the positive rectifier element 22 in the space 28 on the side of the first heat dissipating plate, and the negative rectifier element 23 in the space 29 on the side of the second heat dissipating plate, so that the cooling air passing through the spaces can be utilized for cooling down both of the rectifier elements and thereby cooling performance of the rectifier elements can be improved.

[Fourth Embodiment]

A fourth embodiment is described based on FIGS. 14, 15, 16 and 17.

Figure 14:
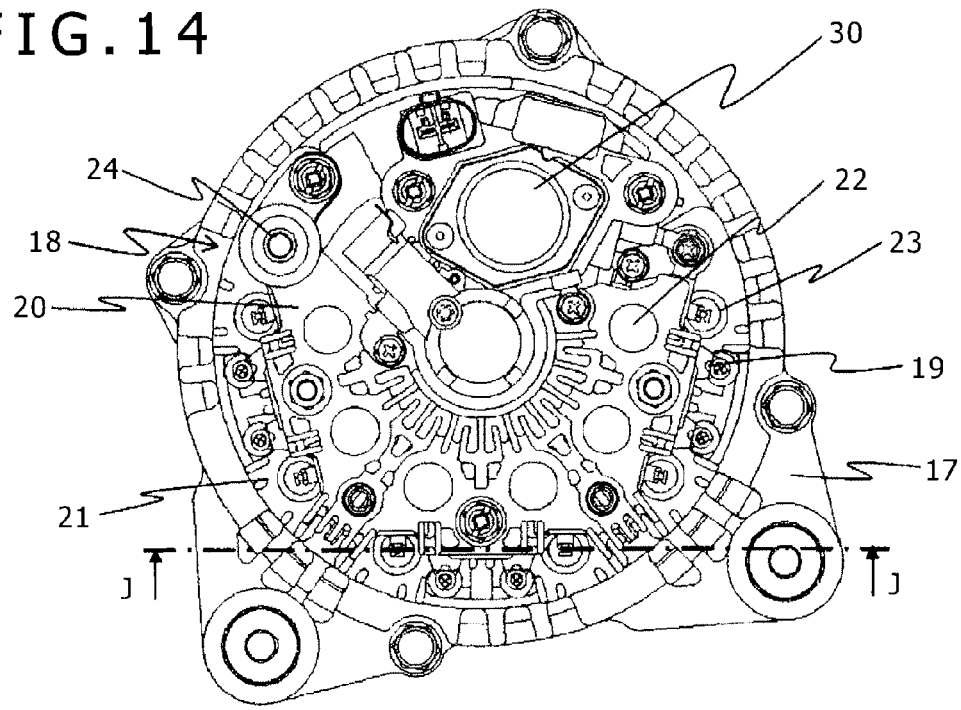
FIG. 14 is a rear-side front view of a vehicle AC generator with a protective cover removed, according to a fourth embodiment of the present invention.
Figure 15:
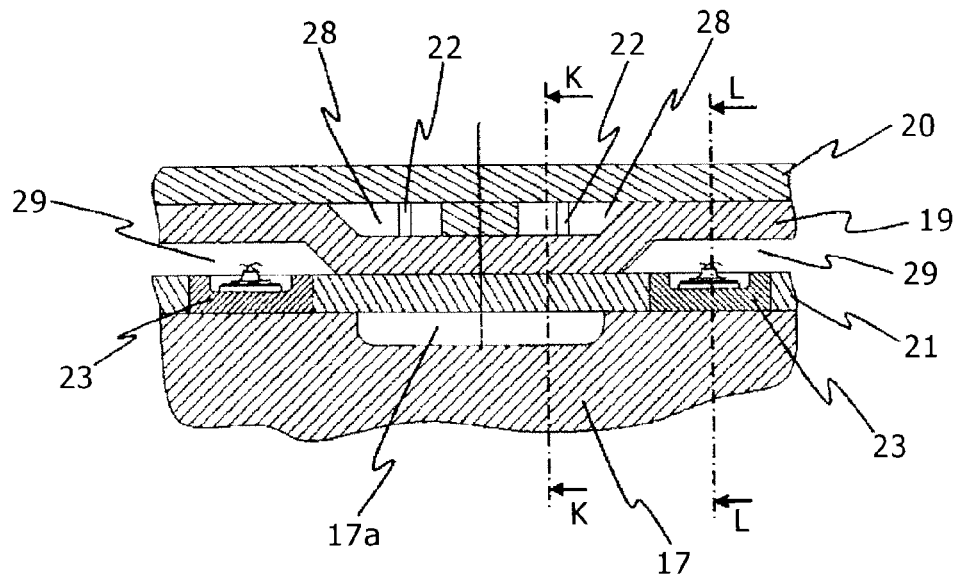
FIG. 15 is a cross sectional view taken from line J-J of FIG. 14.
Figure 16:
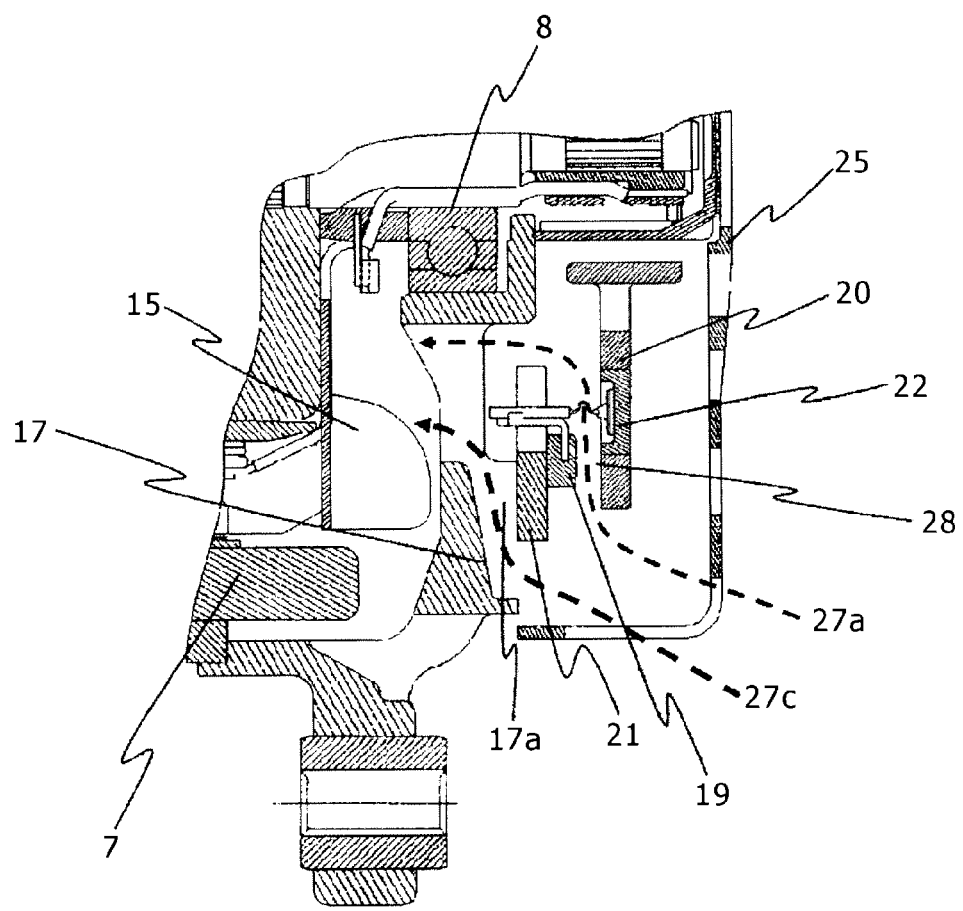
FIG. 16 is a cross sectional view taken from line K-K of FIG. 14.
Figure 17:
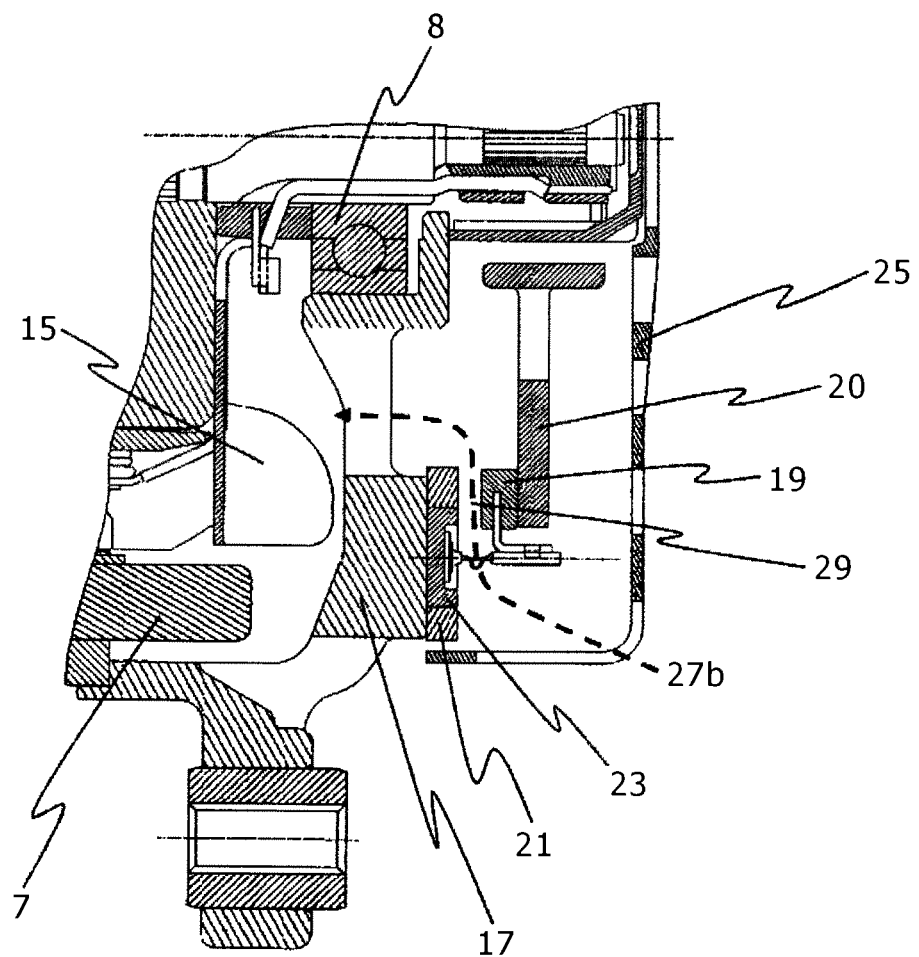
FIG. 17 is a cross sectional view taken from line L-L of FIG. 14.

FIG. 14 is a rear-side front view of a vehicle AC generator according to the fourth embodiment. FIG. 15 is a cross sectional view taken from line J-J of FIG. 14. FIG. 16 is a cross sectional view taken from line K-K of FIG. 15.

According to the present embodiment, a positive rectifier element 22 is disposed in a space 28 on the side of the first heat dissipating plate, and a cooling air 27 is guided to pass through the space 28 on the side of the first heat dissipating plate, as shown in FIG. 14 and FIG. 15, to directly cool down the positive rectifier element 22 and thereby improve temperature reduction effect. Further, a space 17a is provided between the second heat dissipating plate 21 and the rear frame 17, and a cooling air 27a is guided to pass through the space 17a between the second heat dissipating plate 21 and the rear frame 17 as shown in FIG. 16 which is a cross sectional view taken from line K-K of FIG. 15, to cool down the second heat dissipating plate 21.

Further, a negative rectifier element 23 is disposed in a space 29 on the side of the second heat dissipating plate, and a cooling air 27b is guided to pass through the space 29 on the side of the second heat dissipating plate to directly cool down the negative rectifier element 23 and thereby improve temperature reduction effect. Further, the negative rectifier element 23 and the rear frame 17 are in direct contact with each other, so that heat is dissipated directly to the rear frame 17 having a large heat dissipating area and thereby temperature reduction effect of the negative rectifier element 23 can be improved.

According to the present embodiment, negative rectifier elements 23 and the rear frame 17 are disposed in direct contact with each other to cause the rear frame 17 to effect heat dissipation, and a space is provided between the second heat dissipating plate 21 (except portions where negative rectifier elements 23 are disposed) and the rear frame 17 to allow the cooling air to pass therethrough. With this configuration, cooling efficiency can be enhanced compared with the third embodiment.

In addition to the embodiments of the present invention described above, other adoptable configurations are listed hereunder.

Although the above embodiments are described based on the vehicle AC generator as an embodiment of the rotating electrical machine, the present invention also facing may apply to a vehicle generator motor such as a motor generator serving for both power generation and driving.

Although, in the above embodiments, the configuration of the rectifier device is described by citing stator windings comprising two pairs of three-phase windings, stator windings comprising a pair of three-phase windings also can be used. In such a case, a rectifier device can be configured with half the number of positive and negative rectifier elements compared with the embodiments described herein.

Although the above embodiments are described based on the premise that a Pn-junction diode is used as a rectifier element, a switching element (power transistor, MOSFET, or the like) also can be used as a rectifier element.

Although the present invention has been described in its preferred form, it will be apparent to those skilled in the art that the present invention is not limited thereto and various changes and modifications can be made without departing from the spirit and scope thereof.

LIST OF REFERENCE SIGNS

1 Pulley
2 Shaft
3 Front bearing
4 Rotor
5 Stator
6 Stator iron core
7 Stator windings
8 Rear bearing
9 Front nail-shaped magnetic pole
10 Rear nail-shaped magnetic pole
11 Field windings
12 Slip ring
13 Brush
14 Front fan
15 Rear fan
16 Front frame
17 Rear frame
17a Space between second heat dissipating plate and rear frame
18 Rectifier device
19 Rectifier element connection plate
19a Insulating material portion
19b Connection terminal
20 First heat dissipating plate
21 Second heat dissipating plate
22 Positive rectifier element
23 Negative rectifier element
24 Terminal bolt B
25 Protective cover
26 Front-side cooling air
27 Rear-side cooling air
27a Cooling air passing through space between first heat dissipating plate and rectifier element connection plate 27b Cooling air passing through space between second heat dissipating plate and rectifier element connection plate 27c Cooling air passing through space between second heat dissipating plate and rear frame 28 Space between first heat dissipating plate and rectifier element connection plate 29 Space between second heat dissipating plate and rectifier element connection plate 30 Vehicle AC generator

The invention claimed is:

1. A vehicle AC generator, comprising:
a stator comprising stator windings;
a front frame and a rear frame, each rotatably supporting a rotor in the stator facing thereto via a space on an inner circumference of the stator;
a cooling fan fitted to the rotor;
a first polarity arm configured to rectify a current one polarity;
a second polarity arm configured to rectify a current of another polarity;
a rectifier device configured to rectify an alternating current generated in the stator windings; and
a protective cover covering the rectifier device,
the rectifier device comprising:
   a first heat dissipating plate having a plurality of rectifier elements forming the first polarity arm;
   a second heat dissipating plate having a plurality of rectifier elements forming the second polarity arm; and
   a connection plate formed in a waveform-like shape and disposed between the first heat dissipating plate and the second heat dissipating plate;
   a first space, which serves as a passage of a cooling air blown by the cooling fan, formed between the first heat dissipating plate and the connection plate; and
   a second space, which serves as a passage of a cooling air blown by the cooling fan, formed between the second heat dissipating plate and the connection plate,
wherein:
the first space has a first space height indicating a distance between the first heat dissipating plate and the connection plate in the first space, and has a first space width indicating a length of the first space in a direction perpendicular to a plate-thickness direction of the connection plate,
the second space has a second space height indicating a distance between the second heat dissipating plate and the connection plate in the second space, and has a second space width indicating a length of the second space in the direction perpendicular to the plate-thickness direction of the connection plate, and
the first space height, the first space width, the second space height, and the second space width are adjusted such that a temperature of the plurality of rectifier elements forming the first polarity arm temperature of the plurality of rectifier elements forming the second polarity arm are balanced with each other.

2. The vehicle AC generator according to claim 1, wherein the first space width is larger than the second space width.

3. The vehicle AC generator according to claim 1, wherein the second heat dissipating plate is fixed in contact with the rear frame.

4. The vehicle AC generator according to claim 1, wherein the one polarity is positive, and the another polarity is negative.

5. The vehicle AC generator according to claim 1, wherein:
a cooling fin formed on the first heat dissipating plate is disposed in the first space, and
a cooling fin formed on the second heat dissipating plate is disposed in the second space.

6. The vehicle AC generator according to claim 1, wherein:
a rectifier element forming a first polarity arm is disposed in the first space, and
a rectifier element forming a second polarity arm is disposed in the second space.

7. The vehicle AC generator according to claim 1, wherein
a recessed portion for flowing a cooling air is provided in the rear frame in contact with the second heat dissipating plate except portions in the vicinity where the rectifier elements forming the second polarity arm are disposed.

* * * * *